May 18, 1965  L. F. S. TISSOT-DUPONT  3,183,686
PRESSURE REDUCER FOR LIQUEFIED GAS CONTAINERS
Filed March 27, 1962  3 Sheets-Sheet 1
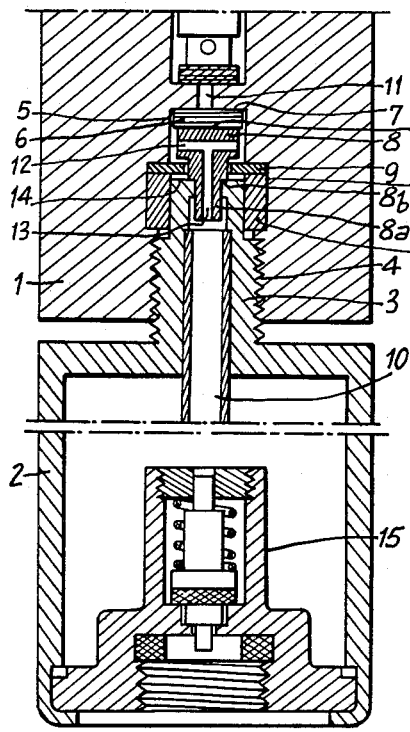
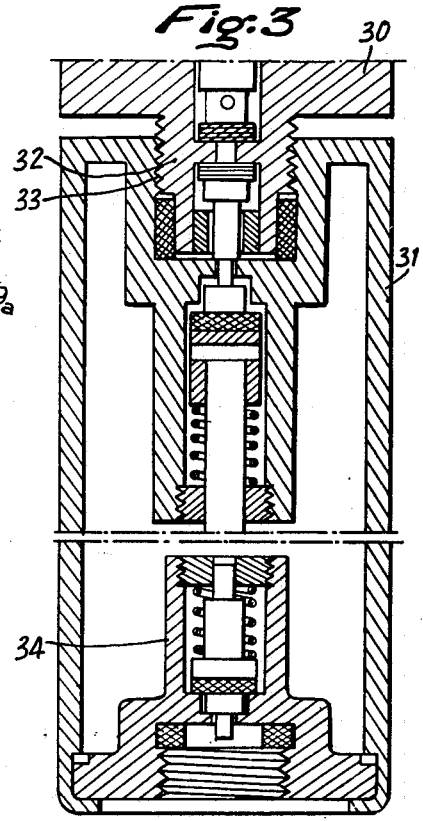

May 18, 1965 L. F. S. TISSOT-DUPONT 3,183,686
PRESSURE REDUCER FOR LIQUEFIED GAS CONTAINERS
Filed March 27, 1962 3 Sheets-Sheet 2
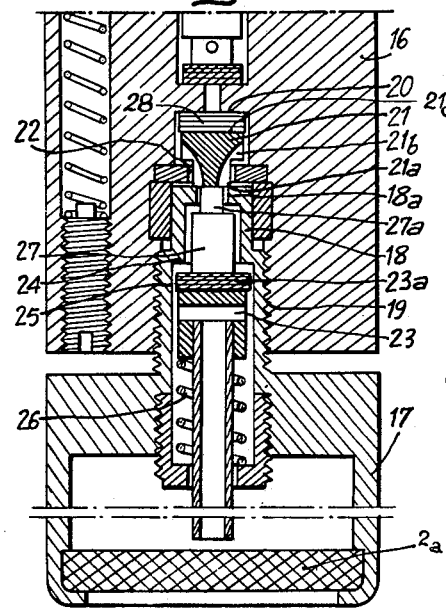
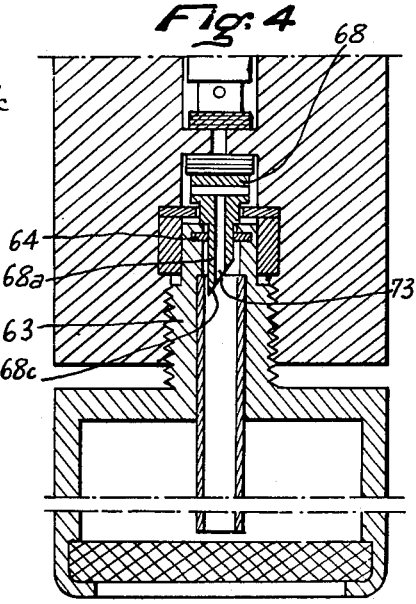

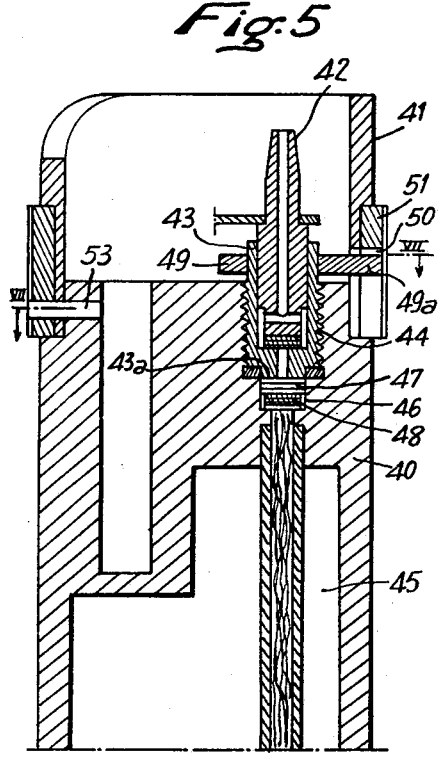
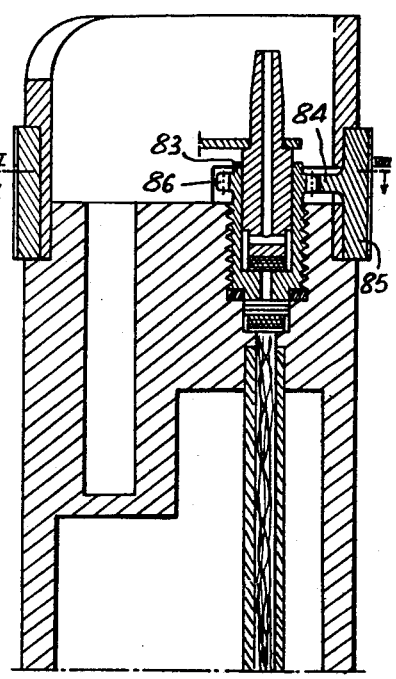
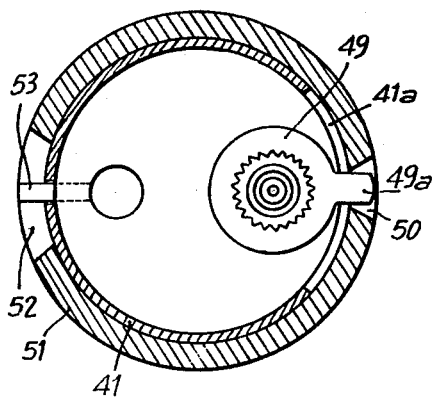
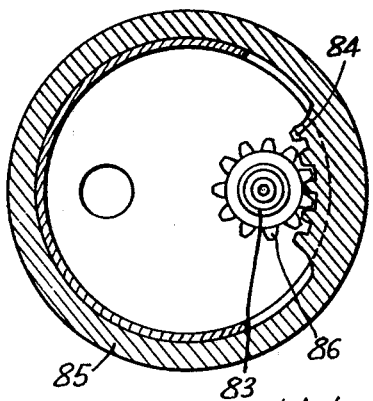

United States Patent Office 3,183,686
Patented May 18, 1965

3,183,686
PRESSURE REDUCER FOR LIQUEFIED
GAS CONTAINERS
Lucien François Simon Tissot-Dupont, Paris, France,
assignor to S. T. Dupont, Paris, France, a French
limited-liability company
Filed Mar. 27, 1962, Ser. No. 182,763
Claims priority, application, France, July 1, 1961,
866,712
5 Claims. (Cl. 67—7.1)

My invention has for its object a pressure reducer for liquefied gas containers including an expansion chamber inside which is housed a regulating member; according to the invention, said regulating member is constituted by a cake of compressible material which is permeable in its inoperative condition and which is fitted between two carrier surfaces into which open respectively the gas admission and exhaust channels, said surfaces following the relative movement of two cooperating parts which are interconnected by cooperating threads coaxial with the expansion chamber.

The compressible cake may be constituted by a porous material such as felt or else by a homogeneous material which is not porous, such as an elastically deformable plastic material, provided with one or more channels for the passage of gas through the cake, said channels being completely closed when the cake is subjected to a predetermined extent of crushing.

The mere rotation of one of the cooperating threadedly interconnected parts with reference to the other allows adjusting the extent of permeability of the cake and consequently the gas throughput, it is thus possible to produce for instance an accurate adjustment of the length of the flame of a gas lighter.

A number of embodiments of the invention are illustrated by way of example in the accompanying drawings wherein:

FIGS. 1, 2, 3, 4, 5 and 6 are partial cross-sections of different gas lighters according to the invention, FIGS. 7 and 8 are cross-sections respectively through lines VII—VII of FIG. 5 and VIII—VIII of FIG. 6.

In FIG. 1, the gas lighter includes a lighter head 1 of a cylindrical shape carrying the lighting means which are not illustrated and a gas container 2 also cylindrical arranged coaxially with reference to the head 1 to which it is secured through a threaded neck section 3 engaging a cooperating tapped bore 4 formed in said head 1.

The head 1 and the container 2 form thus the cooperating parts the spacing of which may be adjusted through a relative rotation of said parts.

A stop which is not illustrated prevents any complete unscrewing leading to a fortuitous separation between the two parts. A cylindrical housing 5 forming an expansion chamber is formed in the head 1 coaxially with the bore 4 and carries a cake 6 of filter paper held fast between two transverse bearing surfaces formed respectively at the end 7 of the housing and at the end 8c of an intermediate member 8 set inside said housing and engaging the throttled section constituted by the opening of a small diameter formed in the washer 9. Said washer is held in position in its turn by a fluidtight, elastically deformable sleeve 9a carried inside a cylindrical housing 9b formed in the head 1 underneath the housing 5. The intermediate member 8 includes an extension 8a passing through said throttled section and is provided with an annular bearing surface 8b adapted to engage the extreme transverse surface 14 of the neck 3 so as to lie along the axis of the pipe 10 engaging said neck and through which the gas is admitted.

A channel 11, on one hand, and channels 12 and 13 on the other hand adapted to provide for the passage of the gas are formed respectively in the head 1 in registry with the bearing surface 7 and in the intermediate member 8.

A valve device of a type known per se and generally designated by the reference number 15 allows introducing liquefied gas into the container 2. When the user wishes to adjust the length of the flame produced by his lighter, and thereby the throughput of gas, it is sufficient for him to make the head 1 rotate with reference to the container 2. Said rotation, by reason of the engagement between the threaded neck 3 and the bore 4 produces, for instance, a reduction in the spacing of the head with reference to the container.

The upper end 14 of the neck urges the intermediate member 8 upwardly through the extension 8a of the latter against the bearing surface 7 over which it compresses the cake of filter paper of which the permeability is thus reduced and this reduces consequently the throughput of gas through the channel 11 towards the burner which is only partly shown in FIG. 1.

Obviously the reverse rotation of the head 1 will have for its result an increase of the gas throughput.

In FIG. 2, the lighter is provided with a head or cap 16 and with a gas container 17 similar to those described hereinabove and interconnected similarly through a threaded neck 18 and a cooperating tapped bore 19.

The outer end of the expansion chamber 20 forms one of the transverse bearing surfaces while the other transverse bearing surface is constituted by the end 21c of the intermediate member 21 the structure of which is similar to that illustrated in FIG. 1; however the gas feeding channels are constituted in the case of FIG. 2 by peripheral grooves 21b formed in axial planes whereas the end of the extension 21a of the member 21 passing through the throttled opening in the washer 22, is designed so as to register with the extreme transverse surface of the neck 18. The intermediate member 21 is as precedingly set inside an expansion or pressure reducing chamber.

The neck 18 carries a safety valve 23 provided with a fluidtight packing 23a cooperating wtih an annular bearing surface 24 formed on an inner step formed in the neck and provided with a lateral clearance 25 which allows the passage of gas when the valve packing is no longer in contact with its bearing surface 24. The valve is returned into contact with said bearing surface 24 through a coil spring 26.

Furthermore, the surface of the valve packing facing away from the valve 23 is subjected to the action of a push member 27 set in the extreme section of the neck 18 inside a throttled section 18a of the latter, an extension 27a of said push member 27 extending through said throttled section to engage the extension 21a of the intermediate member 21.

The extension of the push member 27a engages with a clearance the neck 18 in a manner such that the gas may easily pass alongside of it.

Lastly the container is closed at the end opposed to the neck 18 by a cover 2a of a transparent material through which it is possible to check the liquid level.

The operation of the arrangement is as follows:

Before the assembly of the head 16 with the container 17, the valve in the latter is held in its closed position by the spring 26 and the gas cannot pass out of the container. For this position, the extension 27a of the push member projects slightly beyond the threaded neck 18 when the container is fitted over the head through a screwing of the threaded neck 18 into the tapped bore 19 so that the extension 27a of the push member acting on the valve engages the extension 21a of the member 21. The resistance against crushing of the cake of filter paper 28 leads to an opening of the valve 23 by reason of the thrust exerted by the intermediate member on the push member 23. The gas can then escape out of the container and pass through the filtering cake 28.

When the rotation is continued in the same direction, the extension 21a of the intermediate member 21 engages the end of the neck 18 which leads to a crushing of the filtering cake and consequently to a reduced throughput of gas.

Obviously the reverse operation produces an increase in the throughput but it should be remarked that this reverse operation ends necessarily with a closing of the valve. The pressure reducing system illustrated in FIG. 2 plays the part of a safety device which ensures a closing of the gas container at the moment at which the throughput of gas has a tendency to increase exaggeratedly by reason of the then insufficient pressure exerted on the cake of filtering paper.

It is also possible in the case of FIG. 1 to substitute for the container 2 another container of a non-refillable type in which the valve is replaced by a diaphragm adapted to be perforated.

In the embodiment illustrated in FIG. 3, which includes all the general features of the embodiment according to FIG. 2, the head 30 carries a threaded neck 32 and the gas container 31 is provided with a tapped bore 33 cooperating with said neck, said container carrying at the end opposed to the bore 33 a filling valve designated generally by the reference number 34.

FIG. 4 illustrates a modification of FIG. 1 wherein the threaded neck 63 is closed by a diaphragm 64 of a polyamidic material inserted across its outer end whereas the extension 68a of the intermediate bearing member 68 through which passes the channel 73 serving as an input for the gas is provided with a bevelled end 68c similar to that of hypodermic needles, so as to ensure automatically the perforation of the diaphragm 64 as soon as the container 3 is fitted over the head 1.

In the embodiment illustrated in FIGS. 5 and 7, the gas lighter is provided with a cylindrical body 40 enclosing the gas container 45 and capped by a flame guard 41 carrying an igniting device which is not illustrated. The burner nozzle 42 is carried by a support 43 which is outwardly threaded and engages a cooperating tapped bore 44 formed in the body 40.

The bore 44 extends into a further bore or recess 46 of a reduced cross-section forming the housing for the filter paper cake 47. One of the bearing surfaces for said cake is constituted by a washer 48 fitted at the bottom of the recess 46 while the other bearing surface is constituted by the end 43a of the support 43 for the burner nozzle.

Said support is rigidly secured at its upper end to a coaxial washer 49 carrying a radial projection 49a fitted inside an opening 50 formed in a ring 51 adapted to rotate round the flame guard 41. An elongated port 52 formed in the diametrical plane of the ring 51 cooperates with a projection 53 rigid with the body 40 of the lighter so as to limit the amplitude of the rotary movement of the ring whereas a notch 41a in the flame guard allows a restricted angular shifting of the projection 49a through the ring.

The embodiment illustrated in FIGS. 6 and 8 is a modification of that which has just been described wherein however the means driving into rotation the support 83 for the burner nozzle are constituted by a toothed sector 84 rigid with the rotary ring 85 and meshing with a pinion 86 coaxially rigid with said support 83.

It should be remarked that the compressible cake may be constituted for instance by a small piece of felt or the like cellular material such as sponge plastic material.

What I claim is:

1. In a lighter, the combination of a container for liquefied gas, a cap enclosing an expansion chamber communicating with the inside of the container and provided at its end remote from the container with a transverse surface and with an opening in the latter for the outlet of the gas, a filtering cake fitted inside the expansion chamber over said transverse surface, the passage of gas through said cake being throttled and reduced gradually to zero upon compression, an intermediate member carried by the cap and engaging the surface of the cake opposed to said transverse bearing surface, a threaded connection between the cap and the container adapted upon relative rotation of the cap with reference to the container to shift the latter in axial direction relative to the cap and cooperating with the intermediate member to shift said member in the same direction relative to the cake to compress the latter to a varying extent.

2. In a lighter, the combination of a container for liquefied gas, a cap enclosing an expansion chamber communicating with the inside of the container, and provided at its end remote from the container with a transverse surface and with an opening in the latter for the outlet of the gas, a filtering cake fitted inside the expansion chamber over said transverse surface, the passage of gas through said cake being throttled and reduced gradually to zero upon compression, an intermediate member carried by the cap, adapted to slide inside the expansion chamber over a limited path and engaging the surface of the cake opposed to said transverse bearing surface, a threaded connection between the cap and the container adapted upon relative rotation of the cap with reference to the container to shift the latter in axial direction relative to the cap and cooperating with the intermediate member to shift said member in the same direction relative to the cake to compress the latter to a varying extent.

3. In a lighter, the combination of a container for liquefied gas, a cap enclosing an expansion chamber communicating with the inside of the container and provided at its end remote from the container with a transverse surface and with an opening in the latter for the outlet of the gas, a filtering cake fitted inside the expansion chamber over said transverse surface, the passage of gas through said cake being throttled and reduced gradually to zero upon compression, a valve carried by the container, a seat in the container for the valve, a spring urging it against its seat, an intermediate member slidably mounted inside the expansion chamber and having one end engaging the surface of the cake opposed to said transverse bearing surface and an opposite end engaged by said valve so that said spring also urges said intermediate member toward said transverse bearing surface, an abutment in the expansion chamber limiting the path of the intermediate member between it and the point defined by engagement between the valve and its seat, a threaded connection between the cap and the container adapted upon relative rotation of the cap with reference to the container to shift the latter in axial direction relative to the cap to change thereby the compression of said spring and thereby the force with which said intermediate member is pressed toward said transverse bearing surface to vary the compression of said cake.

4. In a lighter, in combination, a container member for gas under pressure and having an outer surface adapted to be gripped during use of the lighter; a burner; a support member carrying said burner, one of said members being formed with a bore provided with an inner screw thread and the other of said members being formed with an extension provided with an outer screw thread and threadingly engaging said inner screw thread of said bore so that said members may be turned with respect to each other about the axis of said bore; passage means coaxial with said bore for providing communication between said container and said burner, said passage means forming in said one member an expansion chamber having an end face transverse to the axis of the passage means, and a free channel having an open end at said end face and another open end communicating with said burner, said extension having an end face substantially parallel to and facing said end face of said expansion chamber; adjustable flow reducer means formed by a porous elastically compressible material in said expansion chamber abutting with one face thereof against said end face of said expansion chamber and extending across said one end of said channel, whereby gas pressure equal to that in the container may build up in said channel when said burner is not in operation while flow of gas through said channel to said burner during operation thereof will be controlled by said adjustable flow reducer means; and means cooperating with said adjustable flow reducer means for changing the compression of the elastically compressible material thereof and including an intermediate member between said adjustable flow reducer means and said end face of said extension, said intermediate member having opposite ends respectively abutting against said end face of said extension and against the surface of said compressible material opposite that engaging said end face of said expansion chamber so that during turning of said container member with respect to said support member said compressible material is compressed between said end face of said expansion chamber and said intermediate member to control thereby the flow of gas through said channel to said burner when the burner is in operation and therewith the height of the flame produced by said burner.

5. In a lighter, in combination, a container member for gas under pressure and having an outer surface adapted to be gripped during use of the lighter; a burner; a support member carrying said burner, one of said members being formed with a bore provided with an inner screw thread and the other of said members being formed with an extension provided with an outer screw thread and threadingly engaging said inner screw thread of said bore so that said members may be turned with respect to each other about the axis of said bore; passage means coaxial with said bore for providing communication between said container and said burner, said passage means forming in said one member an expansion chamber having an end face transverse to the axis of the passage means, and a free channel having an open end at said end face and another open end communicating with said burner, said extension having an end face substantially parallel to and facing said end face of said expansion chamber, said passage means extending through said extension and forming a valve seat therein facing away from said end face of said expansion chamber; adjustable flow reducer means formed by a porous elastically compressible material in said expansion chamber abutting with one face thereof against said end face of said expansion chamber and extending across said one end of said channel, whereby gas pressure equal to that in the container may build up in said channel when said burner is not in operation while flow of gas through said channel to said burner during operation thereof will be controlled by said adjustable flow reducer means; and means cooperating with said adjustable flow reducer means for changing the compression of the elastically compressible material thereof and including an intermediate member slidably guided in said expansion chamber and having one end engaging said adjustable flow reducer means at a face thereof opposite to the face abutting against said end face of said expansion chamber and an opposite end, a valve member adapted to engage said valve seat and having an end engaging said opposite end of said intermediate member, and compression spring means biased to urge said valve member toward said valve seat and thereby said intermediate member toward said end face of said expansion chamber, said compression spring means arranged so that the compression thereof is changed during turning of said support member relative to said container member for changing thereby the force with which said intermediate member is pressed against said adjustable flow reducer means and so that during turning of said container member with respect to said support member said compressible material is compressed between said end face of said expansion chamber and said intermediate member to control thereby the flow of gas through said channel to said burner when the burner is in operation and therewith the height of the flame produced by said burner.

References Cited by the Examiner

UNITED STATES PATENTS

| 2,459,042 | 1/49 | Nave et al. | 67—7.1 |
| 2,498,142 | 2/50 | Stokes | 67—7.1 |
| 2,521,180 | 9/50 | Morse | 67—7.1 |
| 2,765,259 | 10/56 | Schwalge | 210—550 X |
| 3,096,636 | 7/63 | Newman | 67—7.1 |

FOREIGN PATENTS

| 591,200 | 1/60 | Canada. |
| 971,051 | 6/50 | France. |
| 971,070 | 12/58 | Germany. |
| 736,936 | 9/55 | Great Britain. |

EDWARD J. MICHAEL, *Primary Examiner.*